United States Patent
Song et al.

(10) Patent No.: US 11,515,698 B2
(45) Date of Patent: Nov. 29, 2022

(54) ENERGY STORAGE SYSTEM HAVING ARC MONITORING FUNCTION

(71) Applicant: SN Co., Ltd., Daejeon (KR)

(72) Inventors: Soo Joon Song, Daejeon (KR); Seung Seop Kim, Daejeon (KR)

(73) Assignee: SN Co., Ltd., Daejeon (KR)

(*) Notice: Subject to any disclaimer, the term of this patent is extended or adjusted under 35 U.S.C. 154(b) by 189 days.

(21) Appl. No.: 17/085,332

(22) Filed: Oct. 30, 2020

(65) Prior Publication Data

US 2021/0281061 A1 Sep. 9, 2021

(30) Foreign Application Priority Data

Mar. 6, 2020 (KR) .................. 10-2020-0028457

(51) Int. Cl.
*H02H 1/00* (2006.01)
*H01M 10/651* (2014.01)
*H02S 50/10* (2014.01)

(52) U.S. Cl.
CPC ........ *H02H 1/0023* (2013.01); *H01M 10/651* (2015.04); *H02S 50/10* (2014.12)

(58) Field of Classification Search
None
See application file for complete search history.

(56) References Cited

U.S. PATENT DOCUMENTS

| 2015/0061696 A1* | 3/2015 | Dahmani | G01N 29/28 73/645 |
| 2018/0040920 A1* | 2/2018 | Takatsuka | H01M 10/425 |

FOREIGN PATENT DOCUMENTS

| CN | 103336223 A | * 10/2013 |
| KR | 10-1887992 B1 | 9/2018 |
| KR | 10-1941184 B1 | 1/2019 |

* cited by examiner

*Primary Examiner* — Patrick Assouad
*Assistant Examiner* — Haidong Zhang
(74) *Attorney, Agent, or Firm* — Paratus Law Group, PLLC (57) ABSTRACT

Disclosed is an energy storage system having an arc monitoring function. The system includes: an outer casing storing an energy storage unit and a PCS therein; a sound sensor installed outside the outer casing to detect sound generated from an inside of the outer casing; a temperature and humidity sensor installed outside the outer casing to detect humidity and temperature of the outer casing; and an arc detection device analyzing a frequency of a sound generated in the energy storage unit and the PCS based on correlation between temperature and humidity to detect an arc signal included in the sound and monitoring an arc based on the detected arc signal.

6 Claims, 8 Drawing Sheets

FIG. 1

*-Prior Art-*

Normally operated arc generation situation

<Normally operated arc generation situation>

<Incorrect operation-concerned arc generation situation>

FIG. 2

*-Prior Art-*

ENERGY STORAGE SYSTEM HAVING ARC MONITORING FUNCTION

CROSS-REFERENCE TO RELATED APPLICATION

This application claims priority to Korean Patent Application No. 10-2020-0028457 (filed on Mar. 6, 2020), which is hereby incorporated by reference in its entirety.

BACKGROUND

The present disclosure relates to an energy storage system and, more specifically, to an energy storage system having an arc monitoring function.

An energy storage system having an arc monitoring function monitors an arc generated in an internal device and removes causes of a fire in generation of the arc to prevent generation of a fire.

An existing energy storage system having an arc monitoring function is an ESS system having an arc detection function, a temperature detection function, a dew condensation detection function, and a ground faulit detection function, an arc detection device, and a photovoltaic system and an energy storage system including the arc detection device. The ESS system having an arc detection function, a temperature detection function, a dew condensation detection function, and a ground faulit detection function detects not only an arc generated in the ESS system but also a type and a generation position of the arc to detect temperature and dew condensation of the ESS system, operates a blower in detection of the dew condensation to prevent damage by the dew condensation, and interrupts operation of the ESS system in detection of a ground fault, and the arc detection device and the photovoltaic system and an energy storage system including the same measure a current flowing in a serial wire to diagnose whether an arc is generated so as to operate the photovoltaic system and the energy storage system.

An existing arc monitoring device uses arc monitoring using an electric contact and arc monitoring using an optical fiber, and problems occurring in existing arc monitoring will be described.

Figure 1:
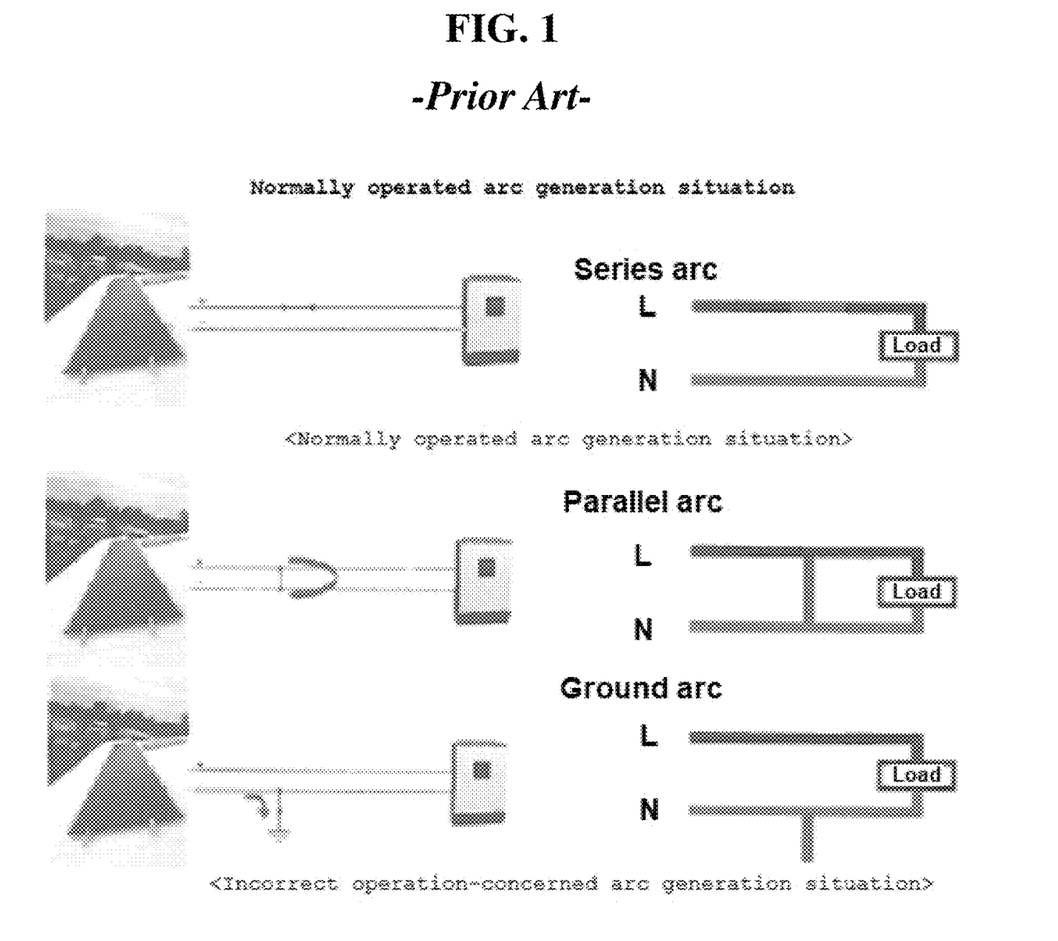
FIG. 1 is a view illustrating the existing electric contact monitoring.

FIG. 1 is a view illustrating the existing electric contact arc monitoring.

As shown in FIG. 1, an arc monitoring device by an electric contact using a current sensor and a voltage sensor has a problem that the device detects an arc from a serial electric contact but does not detect an arc from a parallel electric contact.

Figure 2:
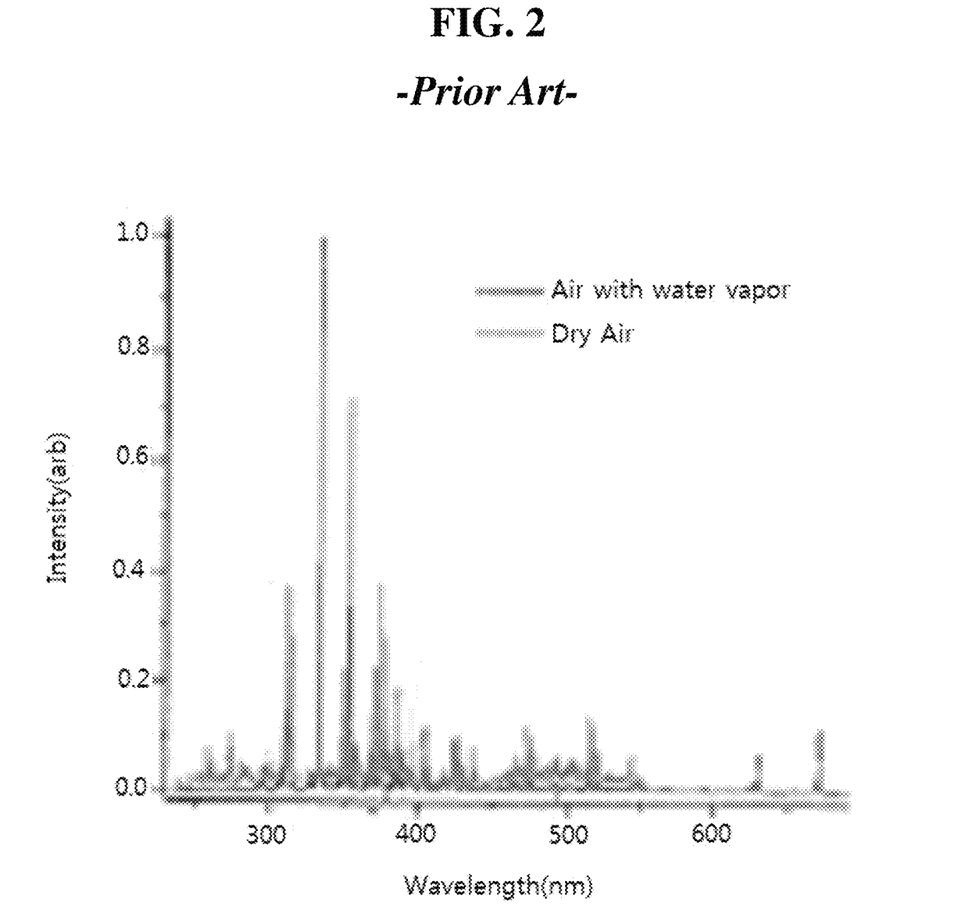
FIG. 2 is a view illustrating an arc spectrum change in accordance with humidity in existing optical fiber monitoring.

FIG. 2 is a view illustrating an arc spectrum change according to humidity in the existing optical fiber arc monitoring.

The optical fiber arc monitoring uses an optical fiber to collect arc light and measure the arc light with a photo detector to determine whether an arc is generated, but light transmissivity is changed in accordance with a material of the optical fiber. Here, blue light and green light appear as major peaks in an arc spectrum and the optical fiber used for the arc monitoring uses a light frequency band of green. There is a problem that a green light peak is reduced in the generated arc spectrum when humidity is increased and arc monitoring performance on the optical fiber arc monitoring is decreased as the intensity of the green light collected in the optical fiber is lowered.

RELATED ART DOCUMENTS

Patent Documents

Patent Document 1: Korean Patent No. 10-1887992, Title: An ESS system including an arc detection function, a temperature detection function, a dew condensation detection function, and a ground faulit detection function Patent Document 2: Korean Patent No. 10-1941184, Title: An arc detection device and a photovoltaic system and an energy storage system including same

SUMMARY

The objective of the present disclosure is to provide an energy storage system having an arc monitoring function, which is not operated in a contact manner and uses a non-contact sound to prevent effects of humidity to monitor an arc signal.

To achieve this, an energy storage system having an arc monitoring function according to one preferred embodiment of the present disclosure may include: an outer casing storing an energy storage unit and a PCS therein; a sound sensor installed outside the outer casing to detect sound generated from the inside of the outer casing; a temperature and humidity sensor installed outside the outer casing to detect the humidity and the temperature of the outer casing; and an arc detection device analyzing a frequency of a sound generated in the energy storage unit and the PCS on the basis of a correlation between temperature and humidity to detect an arc signal included in the sound and monitoring an arc based on the detected arc signal.

Moreover, the arc detection device may include: a correction unit correcting frequency shift of the sound in accordance with the temperature and humidity information of the temperature and humidity sensor; a sound analysis unit acoustically analyzing an electric signal of the corrected sound; and an arc determination unit determining the arc signal included in the electric signal of the sound analysis unit.

Moreover, the sound analysis unit may include: an arc sample extraction unit extracting an arc sample from the electric signal of the sound; a signal generation unit generating an arc signal from the arc sample of the arc sample extraction unit; and a noise addition unit adding noise to the generated arc signal.

Moreover, the arc detection device may include: a sound analysis unit considering frequency characteristics changed as the temperature and humidity information of the temperature and humidity sensor to acoustically analyze the electric signal of the sound; and an arc determination unit determining the arc signal included in the electric signal of the sound analysis unit.

Moreover, the sound analysis unit may include: an arc sample extraction unit extracting, from the electric signal of the sound, an arc sample considering the frequency characteristics changed as the temperature and humidity information is changed; a signal generation unit generating the arc signal from the arc sample of the arc sample extraction unit; and a noise addition unit adding noise to the generated arc signal.

Moreover, the sound analysis unit may include: a deep learning network analyzing the arc sample through deep learning; and a post-processing unit analyzing a frequency of the deep learning-analyzed arc sample to calculate an average value on whether arcs of other spectrograms adjacent to a specific spectrogram are output to determine whether an arc is generated in the specific spectrogram.

As described above, according to the present disclosure, since the arc signal is monitored by using a non-contact sound, the arc signal changed in accordance with temperature and humidity is monitored and causes of a fire are blocked when the arc signal is generated, thereby providing effect of preventing a fire.

Moreover, since the frequency of the arc signal is analyzed by considering the frequency characteristics of the sound that are changed in accordance with the temperature and humidity information, the arc signal generated in the energy storage system can be correctly detected.

DETAILED DESCRIPTION

As the present disclosure allows for various changes and numerous embodiments, particular embodiments will be illustrated in the drawings and described in detail in the written description. However, this is not intended to limit the present disclosure to specific embodiments, it should be understood to include all modifications, equivalents, and substitutes included in the spirit and scope of the present disclosure.

In describing the drawings, similar reference numerals are used for similar elements. If it is determined that the detailed description of the related known technology may obscure the gist of the present disclosure, the detailed description thereof will be omitted.

Terminology such as first, second, and the like used herein may modify various components, but the terminology can be used to distinguish a component from other components and does not limit the components.

For example, without departing from the scope of rights described in this document, a first component may be called a second component, and similarly, the second component may be renamed to the first component.

The term and/or includes a combination of a plurality of related items or any item of a plurality of related items.

The terminology used herein is for the purpose of describing particular example embodiments only and is not intended to be limiting of the present disclosure.

Singular expressions include plural expressions unless the context clearly indicates otherwise. In this application, the terms "comprise" or "having" are intended to indicate that there is a feature, number, step, action, component, part, or combination thereof that is described, and that one or more other features or numbers are present. It should be understood that it does not exclude the possibility of the presence or addition of steps, actions, components, parts or combinations thereof.

Unless defined otherwise, all terms used herein, including technical or scientific terms, have the same meaning as commonly understood by one of ordinary skill in the art.

Terms such as those defined in the commonly used dictionaries should be construed as meanings consistent with the meanings in the context of the related art and shall not be construed in ideal or excessively formal meanings unless expressly defined in this application.

Hereinafter, with reference to drawings, the energy storage system having an arc monitoring function according to one preferred embodiment of the present disclosure will be described in detail. In the following description, descriptions of conventionally well-known matters are omitted or simplified to clarify the gist of the present disclosure.

Figure 3:
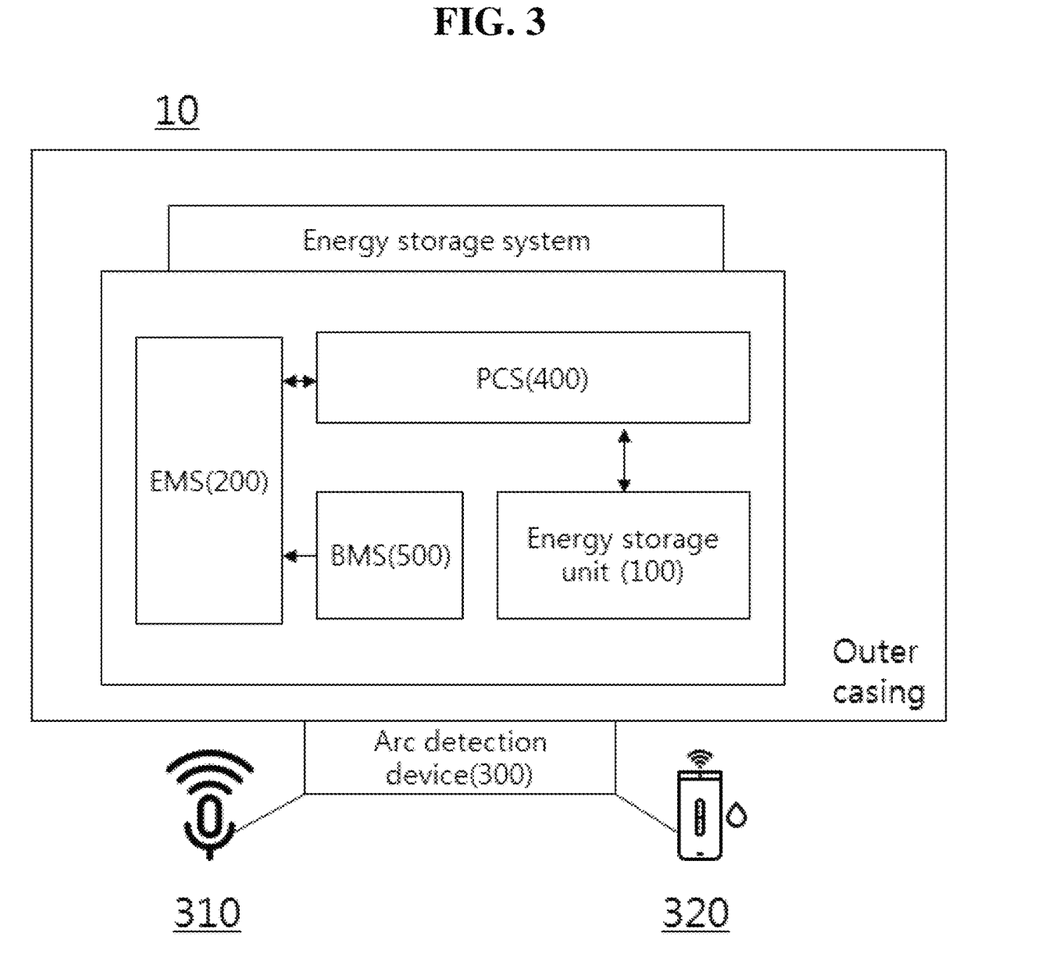
FIG. 3 is a view illustrating the energy storage system having the arc monitoring function.
Figure 4:
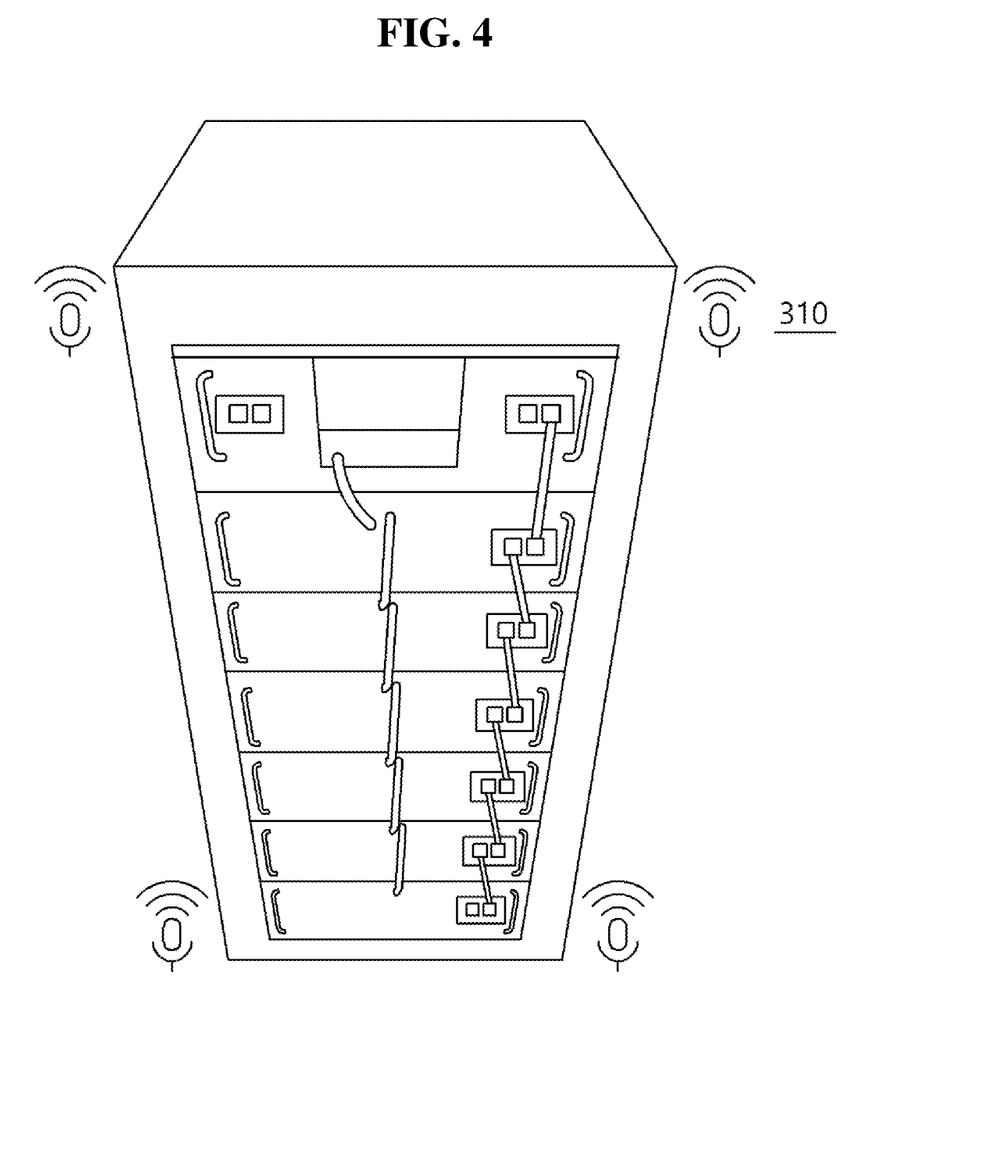
FIG. 4 is a view illustrating the energy storage system having the sound sensor installed therein.
Figure 5:
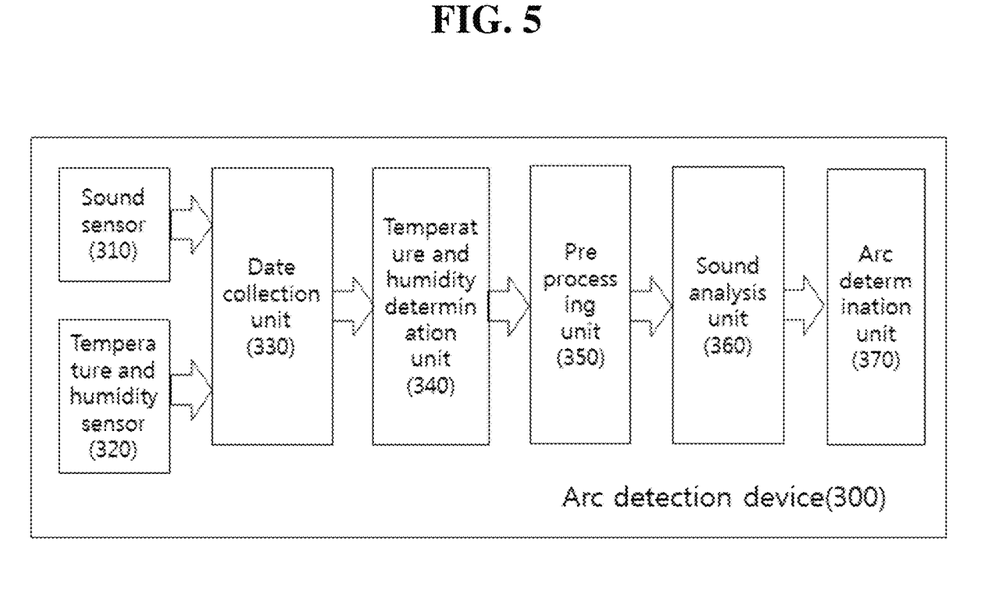
FIG. 5 is a view illustrating a configuration of the arc detection device.
Figure 6:
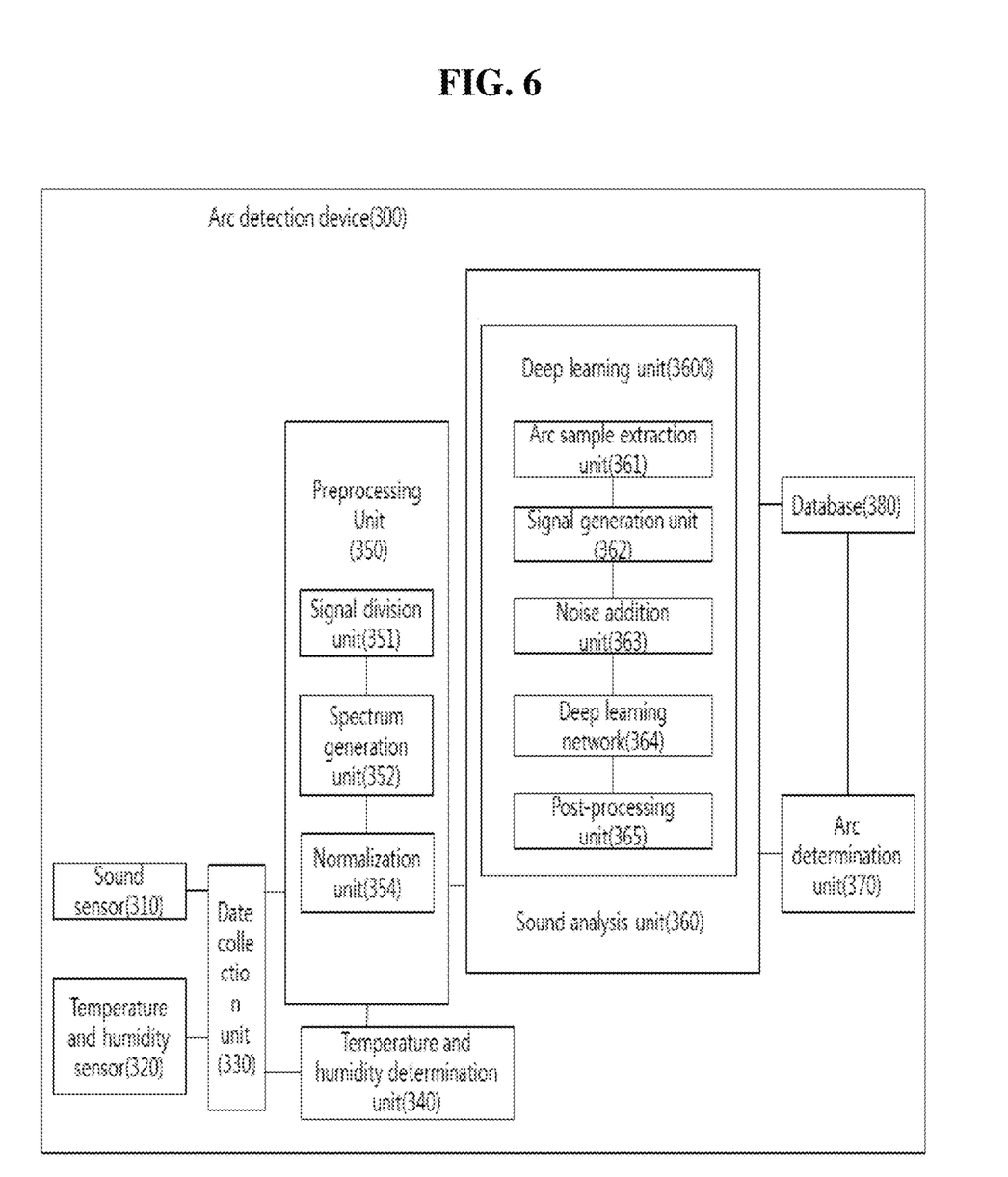
FIG. 6 is a view illustrating a detailed configuration of the arc detection device.
Figure 7:
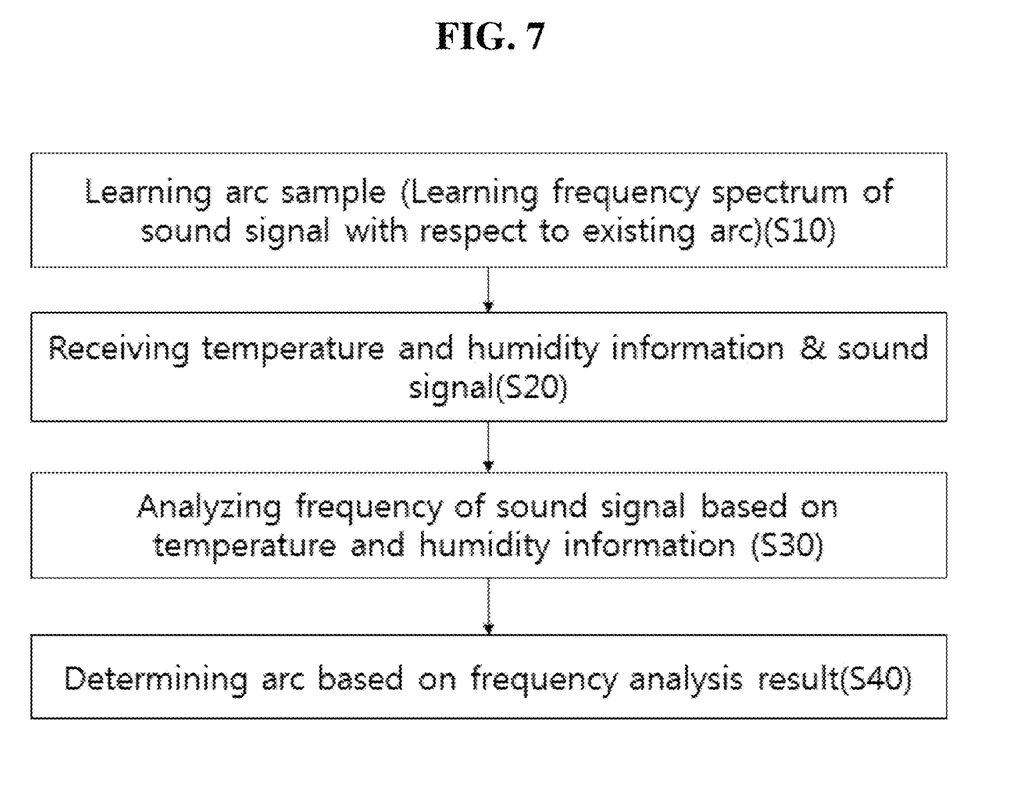
FIG. 7 is a flowchart illustrating an arc detection method.

FIG. 3 is a view illustrating the energy storage system having the arc monitoring function, FIG. 4 is a view illustrating the energy storage system having the sound sensor installed therein, FIG. 5 is a view illustrating a configuration of the arc detection device, FIG. 6 is a view illustrating the detailed configuration of the arc detection device, and FIG. 7 is a flowchart illustrating the arc detection method.

The energy storage system includes: an outer casing 10 storing an energy storage unit 100 and a PCS (Power Conversion System) 400 therein; a sound sensor 310 installed outside the outer casing 10 to detect sound generated from the inside of the outer casing 10; a temperature and humidity sensor 320 installed outside the outer casing 10 to detect the humidity and the temperature of the outer casing 10; and an arc detection device 300 analyzing a frequency of a sound generated in the energy storage unit 100 and the PCS 400 based on correlation between temperature and humidity to detect an arc signal included in the sound and monitoring an arc based on the detected arc signal.

As shown in FIG. 4, the sound sensor 310 is installed at four corners on one external surface of the outer casing 10 and calculates a position, from which an arc is generated in the energy storage system, by triangulation. The energy storage system turns off a power module, from which the arc is generated, to prevent an accident caused by the arc.

The energy storage system having an arc monitoring function includes: the energy storage unit 100 storing electric energy; the PCS 400 integrating the electric energy of the energy storage unit 100; the arc detection device 300 having the arc detection function based on the temperature and humidity information of the energy storage unit 100 and the PCS 400; an EMS (Energy Management System) 200 controlling the PCS 400; and a BMS (Battery Management System) 500 managing the energy storage unit 100.

The energy storage unit 100 stores the electric energy supplied from one or more among photovoltaic, hydroelectric, thermoelectric, and atomic power supply devices. The pcs 400 integrates and outputs the electric energy of the power storage unit 100. The EMS 200 controls the PCS 400. The BMS 500 manages the energy storage unit 100.

The arc detection device 300 analyzes the frequency of sound generated from the energy storage unit 100 and the PCS 400 based on the correlation between temperature and humidity to detect an arc signal included in the sound and monitors the arc based on the detected arc signal to prevent a fire occurring in the energy storage unit 100 or the PCS 400.

The sound sensor 310 detects the sound inside the energy storage system and the temperature and humidity sensor 320 measure the temperature and the humidity outside or inside the energy storage system. The arc detection device 300 receives the electric signal of the sound detected through the sound sensor 310 and receives the temperature and humidity values measured through the temperature and humidity sensor 320. The arc detection device 300 analyzes the frequency of the electric signal of the sound in accordance with the measured temperature and humidity values and determines whether the arc signal is included in the electric signal of the sound to determine generation of the arc and manages an accident when the arc is generated.

In the case in which the sound sensor 310 is a condenser microphone, since the sound input sensitivity of the condenser microphone is changed in accordance with a temperature and humidity change, the sound input sensitivity should be corrected in accordance with the temperature and humidity values of the temperature and humidity sensor 320. Such correction of the sound input sensitivity can be performed separately from a normalization operation of the preprocessing unit 350 or is not required in accordance with the normalization operation of the preprocessing unit 350. In the case which the energy storage system has a constant temperature and humidity function, the condenser microphone has a sound input sensitivity higher than that of an ordinary microphone, is affected less by the temperature and the humidity, and can provide optimal performance. The ordinary microphone is affected less by the temperature and the humidity, but the sound input sensitivity may be lower than that of the condenser microphone. The arc detection device 300 corrects the sound input sensitivity in accordance with a type of the connected sound sensor, the constant temperature and humidity function, and the temperature and humidity values. In the case in which the sound sensor is the condenser microphone and the constant temperature and humidity function does not exist, the sound input sensitivity is corrected. In the case which the sound sensor is the condenser or ordinary microphone and the constant temperature and humidity function exists, the sound input sensitivity is not corrected.

The arc detection device 300 may include: the sound sensor 310 detecting the sound inside the energy storage system to output the electric signal of the sound; the temperature and humidity determination unit 340 determining temperature and humidity; the preprocessing unit 350 receiving the electrostatic of the sound from the sound sensor 310 to process the electric signal of the sound of the energy storage unit 100 and the PCS 400; the sound analysis unit 360 acoustically analyzing the electric signal of the preprocessing unit 350 in consideration of the frequency characteristics changed as the temperature and humidity information of the temperature and humidity determination unit 340 is changed; and the arc determination unit 370 determining the arc signal included in the electric signal of the sound analysis unit 360. The arc detection device 300 may include, as a configuration of a control unit, the temperature and humidity determination unit 340, the preprocessing unit 350, the sound analysis unit 360, and the arc determination unit 370. The temperature and humidity determination unit 340 is connected to the temperature and humidity sensor 320 and the preprocessing unit 350 is connected to the sound sensor 310.

The arc detection device 300 determines the temperature and the humidity to acoustically analyze the electric signal of the energy storage unit 100 and the PCS 400 and determine the arc signal included in the electric signal. The arc detection device 300 acoustically analyzes the electric signal in accordance with temperature and humidity changes and detects the arc signal included in the electric signal. The arc detection device 300 traces a change in the arc signal in accordance with the temperature and humidity changes to manage the change in a database and compares the electric signal of the energy storage unit and the PCS with the arc signal stored in the database to determine whether the arc signal included in the electric signal is generated. When the arc signal is included in the electric signal, the arc detection device 300 determines that the arc signal is generated and the PCS 400 stops operation.

The arc detection device 300 stores the arc signal in the database by each temperature and humidity change, reads the arc signal of the corresponding temperature and humidity change from the database in accordance with the temperature and the humidity measured by the temperature and humidity determination unit 340 to perform first comparison, and compares the read arc signal with other arc signals of the database not used in the first comparison to perform second comparison to differently process comparison of the arc signal through the first and second comparisons. The arc detection device 300 performs the first comparison of the first signal with adaptation to the temperature and humidity change and performs the second comparison with other arc signals not used in the first comparison, thereby providing effect of detecting the arc with adaptation to the temperature and humidity change. The arc signal corresponding to the corresponding temperature and humidity change is compared first with the arc signal and the arc signal corresponding to anther temperature and humidity change is compared second with the electric signal.

The arc detection device 300 included in the energy storage unit 100 and the PCS 400 includes a constant temperature and humidity control device, such that the internal temperature and humidity of the energy storage unit 100 and the PCS 400 can be constantly maintained at all times, but the temperature and the humidity can be changed locally. Accordingly, with respect to the energy storage unit 100 and the PCS 400 showing a local temperature and humidity change, the arc detection device 300 compares the electric signal with generation of the arc signal adapted to the temperature and humidity change.

The temperature and humidity determination unit 340 of the arc detection device 300 measures the temperature and the humidity of a space where the energy storage unit 100 and the PCS 400 are placed in the energy storage system and determines the temperature and humidity information thereof. The preprocessing unit 350 of the arc detection device 300 preprocesses the electric signal of the energy storage unit 100 and the PCS 400 to transfer the preprocessed electric signal to the sound analysis unit 360. The sound analysis unit 360 of the arc detection device 300 acoustically analyzes the electric signal of the preprocessing unit 350 on the basis of the temperature and humidity information of the temperature and humidity determination unit 340. The arc determination unit 370 of the arc detection device 300 determines the arc signal included in the electric signal of the sound analysis unit 360.

The preprocessing unit 350 may include: a signal division unit 351 dividing the electric signal of the sound; a spectrum generation unit 352 converting the frequency of the divided electric signal; and a normalization unit 353 normalizing the frequency-converted electric signal.

The preprocessing unit 350 divides the electric signal of the sound, converts the frequency of the divided electric signal, and normalizes the frequency-converted electric signal. The electric signal normalized in the preprocessing unit 350 is transferred to the sound analysis unit 360, so the sound signal include the electricity signal is acoustically analyzed.

The signal division unit 351 of the preprocessing unit 350 divides the electric signal in accordance with time flow, the spectrum generation unit 352 processes the divided electric signal into a digital signal to convert the frequency, and the normalization unit 353 normalizes the frequency-converted electric signal.

The sound analysis unit 360 may include an arc sample extraction unit 361 extracting, from the electric signal of the sound, the arc sample considering the frequency characteristics changed as the temperature and humidity information; the signal generation unit 362 generating the arc signal from the arc sample of the arc sample extraction unit 361; and the noise addition unit 363 adding noise to the generated arc signal.

The sound analysis unit 360 extracts the arc sample from the electric signal of the sound, generates the arc signal from the arc sample, and adds noise to the generated arc signal. The sound analysis unit 360 extracts the arc sample from the electric signal of the sound to generate the arc signal and add noise thereto.

The arc sample extraction unit 361 of the sound analysis unit 360 extracts the arc sample from the electric signal, the signal generation unit 362 generates the arc signal from the arc sample of the arc sample extraction unit 361, and the noise addition unit 363 adds noise to the generated arc signal.

The sound analysis unit may include: the deep learning network analyzing the arc sample generated by the arc sample extraction unit 361, the signal generation unit 362, and the noise addition unit 363 through deep learning; and the post-processing unit 365 analyzing the frequency of the deep learning-analyzed arc sample to calculate an average value of arcs of other spectrograms adjacent to the specific spectrogram to determine whether an arc is generated in a specific spectrogram.

The sound analysis unit 360 analyzes the arc sample through deep learning and analyzes the frequency of the deep learning-analyzed arc sample to generate the arc signal. The arc sample is used as input data in the sound analysis unit 360 and is a sound signal with respect to the arc signal really generated inside the energy storage system. The arc sample is used as learning data in the deep learning network 364 of the sound analysis unit 360.

The deep learning network 364 of the sound analysis unit 360 analyzes the arc sample through deep learning and the post-processing unit 365 determines whether an arc generated in a specific spectrogram. The deep learning network 364 inputs the arc sample into a neural network to analyze frequency connection of the arc sample through deep learning and output whether the arc is generated in the specific spectrogram, and the post-processing unit 365 calculates the average value of arcs of other spectrograms adjacent to the specific spectrogram to determine whether an arc is generated in the specific spectrogram.

The arc determination unit 370 determines whether an arc corresponding to an output value extracted in the sound analysis unit 360 is generated. The arc determination unit 370 compares an arc signal, which becomes a reference, with the arc signal actually included in the electric signal of the energy storage unit 100 and the PCS 400 to determine whether the arc is generated. Since fire risk is present when the arc signal is generated, a power supply unit 500 stops supporting electricity to an indoor electric apparatus to prevent the fire risk.

FIG. 7 is the flowchart illustrating the arc detection method.

The arc detection device 300 performs learning for a frequency spectrum of the sound information on the existing arc signal to prepare an arc sample (S10), receives the sound signal and the temperature and humidity information from the sound sensor 310 and the temperature and humidity sensor 320 (S20), and performs frequency analysis of the sound signal based on the temperature and humidity information (S30).

The arc detection device 300 inputs a frequency analysis result of the sound signal based on the temperature and humidity information into the deep learning network 364 to perform deep learning and calculates, through the post-processing unit 365, the average value on whether arcs of other spectrograms adjacent to the specific spectrogram are output to determine whether an arc is generated in the specific spectrogram.

The arc detection device 300 determines, based on the frequency analysis result prepared by the deep learning network 364 and the post-processing 365, whether the arc signal is included in the sound signal input from the sound sensor 310 (S40).

Figure 8:
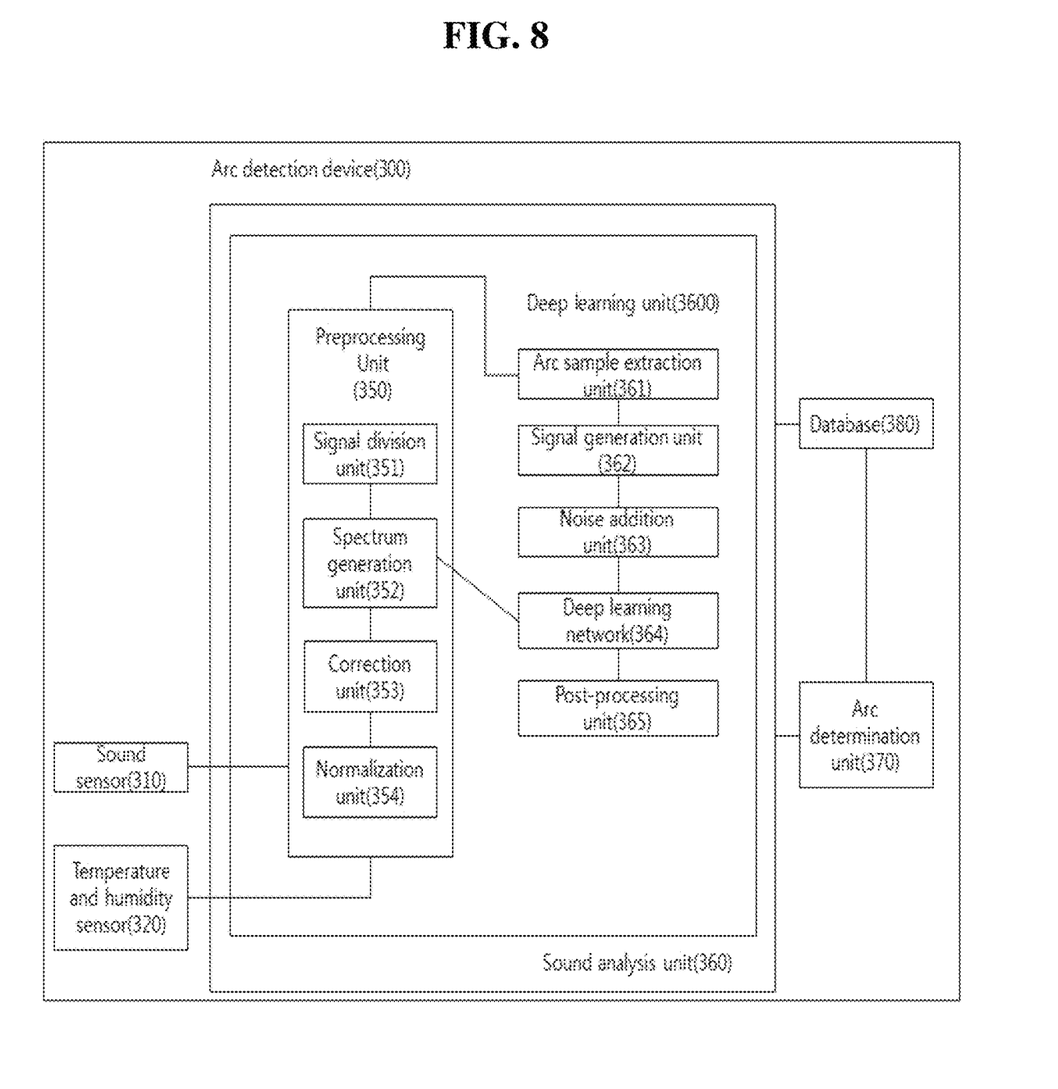
FIG. 8 is a view illustrating the entire configuration of an arc detection device of another embodiment.

FIG. 7 illustrates that the deep learning network 364 deep learns the sound signal based on the temperature and humidity information, and FIG. 8, as another embodiment, illustrates an operation that the correction unit 353 corrects the sound signal whose frequency is shifted by the temperature and humidity change and the deep learning network 364 is deep learned by the corrected sound signal.

FIG. 8 is a view illustrating the entire configuration of the arc detection device of another embodiment.

The sound analysis unit 360 extracts, from the spectrogram through deep learning, an output value on whether the arc is generated. In the arc detection device 300, the deep learning unit 3600 deep learns the sound signal processed by the sound analysis unit 360. The deep learning unit 3600 may include: the arc sample extraction unit 361 extracting the arc sample from the sound signal; the signal generation unit 362 deep learning the extracted arc sample to generate the arc signal; and the noise addition unit 363 adding noise to the generated arc signal. The arc signal learned by the deep learning unit 3600 is stored in the database 380, the database 380 transfers the arc signal to the arc determination unit 370, and the arc determination unit 370 compares the arc signal of the database 380 with the sound signal processed by the sound analysis unit 360 to determine whether the arc signal is included in the sound signal or determine whether the arc corresponding to the output value extracted in the sound analysis unit 360 is generated. The preprocessing unit 350 may include: the signal division unit 351 dividing a signal of the arc signal of the arc sample and a mute region; the spectrum generation unit 352 generating a spectrogram of the signal-divided arc signal; the correction unit 353 correcting the spectrogram of the arc signal in accordance with the temperature and humidity information; and the normalization unit 354 normalizing the corrected spectrogram.

When humidity is increased, the frequency of a sound wave is increased and the intensity thereof is decreased. The correction unit 353 correcting shift of the spectrogram in accordance with such humidity change corrects the frequency spectrum generated by the specific generation unit 352 in accordance with the humidity change. For example, when the humidity is increased, the correction unit 353 uses a correction coefficient considering a humidity increment with respect to reference humidity to increase the frequency of the spectrogram of the spectrum generation unit 352, and, when the humidity is decreased, uses a correction coefficient considering a humidity decrement with respect to the reference humidity to decrease the frequency of the spectrogram of the spectrum generation unit 352. Moreover, as well as correction in accordance with the humidity change, correction in accordance with a temperature change can be performed in the same method as the method of humidity change correction. The spectrogram of the sound signal corrected by the correction unit 353 is input into the deep learning network 364 to be deep learned.

Although the above has been described with reference to the embodiments of the present disclosure, those skilled in the art will be able to variously modify and change the present disclosure without departing from the spirit and scope of the present disclosure as set forth in the claims below.

What is claimed is:

1. An energy storage system having an arc monitoring function, the system comprising:
    an outer casing storing an energy storage unit and a Power Conversion System (PCS) therein;
    a sound sensor installed outside the outer casing to detect sound generated from an inside of the outer casing;
    a temperature and humidity sensor installed outside the outer casing to detect humidity and temperature of the outer casing; and
    an arc detection device analyzing a frequency of a sound generated in the energy storage unit and the PCS based on correlation between temperature and humidity to detect an arc signal included in the sound and monitoring an arc based on the detected arc signal,
    wherein the arc detection device comprises:
    a correction unit correcting frequency shift of the sound in accordance with temperature and humidity information of the temperature and humidity sensor;
    a sound analysis unit acoustically analyzing an electric signal of the corrected sound; and
    an arc determination unit determining the arc signal included in the electric signal of the sound analysis unit.

2. The system of claim 1, wherein the sound analysis unit comprises:
    an arc sample extraction unit extracting an arc sample from the electric signal of the sound;
    a signal generation unit generating an arc signal from the arc sample of the arc sample extraction unit; and
    a noise addition unit adding noise to the generated arc signal.

3. The system of claim 2, wherein the sound analysis unit comprises:
    a deep learning network analyzing the arc sample through deep learning; and
    a post-processing unit analyzing a frequency of the deep learning-analyzed arc sample to calculate an average value of arcs of other spectrograms adjacent to a specific spectrogram to determine whether an arc is generated in the specific spectrogram.

4. An energy storage system having an arc monitoring function, the system comprising:
    an outer casing storing an energy storage unit and a Power Conversion System (PCS) therein;
    a sound sensor installed outside the outer casing to detect sound generated from an inside of the outer casing;
    a temperature and humidity sensor installed outside the outer casing to detect humidity and temperature of the outer casing; and
    an arc detection device analyzing a frequency of a sound generated in the energy storage unit and the PCS based on correlation between temperature and humidity to detect an arc signal included in the sound and monitoring an arc based on the detected arc signal,
    wherein the arc detection device comprises:
    a sound analysis unit acoustically analyzing the electric signal of the sound while considering characteristics of the frequency that are changed as the temperature and humidity information of the temperature and humidity sensor is changed; and
    an arc determination unit determining the arc signal included in the electric signal of the sound analysis unit.

5. The system of claim 4, wherein the sound analysis unit comprises:
    an arc sample extraction unit extracting, from the electric signal of the sound, an arc sample while considering the characteristics of the frequency that are changed as the temperature and humidity information is changed;
    a signal generation unit generating an arc signal from the arc sample of the arc sample extraction unit; and
    a noise addition unit adding noise to the generated arc signal.

6. The system of claim 5, wherein the sound analysis unit comprises:
    a deep learning network analyzing the arc sample through deep learning; and
    a post-processing unit analyzing a frequency of the deep learning-analyzed arc sample to calculate an average value of arcs of other spectrograms adjacent to a specific spectrogram to determine whether an arc is generated in the specific spectrogram.

* * * * *